United States Patent [19]

Riemenschneider et al.

[11] 3,997,653
[45] Dec. 14, 1976

[54] PROCESS FOR THE MANUFACTURE OF CYANOGEN

[75] Inventors: Wilhelm Riemenschneider, Frankfurt am Main; Peter Wegener, Schneidhain, Taunus, both of Germany

[73] Assignee: Hoechst Aktiengesellschaft, Frankfurt am Main, Germany

[22] Filed: June 4, 1975

[21] Appl. No.: 583,516

[30] Foreign Application Priority Data

June 6, 1974    Germany .......................... 2427268
Mar. 18, 1975   Germany .......................... 2511715

[52] U.S. Cl. ............................................. 423/384
[51] Int. Cl.² ............................................ C01C 3/00
[58] Field of Search .......................... 423/384, 364

[56] References Cited

UNITED STATES PATENTS

| 3,135,582 | 6/1964 | Geerts et al. | 423/384 |
| 3,494,734 | 2/1970 | Nakamura | 423/384 |
| 3,615,192 | 10/1971 | Olivier | 423/384 |

*Primary Examiner*—Earl C. Thomas
*Attorney, Agent, or Firm*—Curtis, Morris & Safford

[57] ABSTRACT

Cyanogen is produced by catalytic oxidation of hydrogen cyanide with oxygen in the presence of a catalyst solution. The catalyst solution consists of aliphatic ethers or of nitriles and copper(II)nitrate and may further contain up to 20 % by weight of water.

12 Claims, No Drawings

PROCESS FOR THE MANUFACTURE OF CYANOGEN

This invention is related to a process for the manufacture of cyanogen by means of catalytic oxidation of hydrogen cyanide by oxygen, air or oxygen-containing gases in an inert organic solvent.

Numerous methods are known for preparing cyanogen from hydrocyanic acid, as specified e.g. by R. Fahnenstich et al. Chemiker-Zeitung 96 (1972), pg. 389.

The above mentioned processes in the gaseous phase utilize air, oxygen, chlorine or $NO_2$ as oxidant. These processes run at high temperatures and show low conversion rates and poor yields.

When the processes are carried out catalytically in the gaseous phase, an important disadvantage is the lack of stability of the applied catalysts.

The processes in the liquid phase, as well as most of the processes in the gaseous phase, are carried out with copper salts as catalysts and $O_2$ or $NO_2$ as oxidants, the latter being employed at least at stoichiometric quantities, in relation to hydrogen cyanide.

The oxidation with $NO_2$ in water according to German "Auslegeschrift" No. 1,297,589 is only possible by means of separating nitric oxide, non-reacted $NO_2$ and non-reacted hydrogen cyanide from the cyanogen, a separation which is costly and complicated. Moreover, the separation, reoxidation and recycling of nitrous gases require a second gas circuit.

Another process involves the oxidation of hydrogen cyanide in the aqueous phase by air with copper salts as catalysts (German Pat. No. 1,163,302). However, this process runs at about one tenth of the reaction speed attained by the process of the invention. The process described by the above mentioned German Patent comes to a halt after some hours due to precipitation of CuCN.

It is further known according to German Pat. DBP No. 2,012,509 that hydrocyanic acid may be oxidized with $H_2O_2$ and copper salts, but such a process is costly and complicated, since it requires the use of a high energy oxygen compound.

There is also known a catalytic process for the oxidation of hydrogen cyanide in organic solvents in the presence of copper. (U.S. Pat. No. 3,615,192). This process has considerable disadvantages.

If ketones (e.g. cyclohexanone) are used as solvents, the reaction soon comes to a halt, the solution is discolors, the catalyst precipitates and the pH is rising. Moreover, while separating water, the ketones form condensation products in the acid medium. These condensation products seal with a rubber-like lining the inlet pipe and the walls of the vessel. When using organic acids such as acetic acid, the reaction also stops soon due to the precipitation of the catalyst (cf. comparative example). Under these conditions it is therefore impossible to carry out a continuous reaction over periods which are interesting from a technological point of view. The yeild in cyanogen is one poor one.

It has now been found surprisingly that all the disadvantages of the above mentioned processes can be avoided, if the reaction is carried out in aliphatic ethers or in nitriles, since in that case the oxidation is executed speedily in one single step directly by means of oxygen and it is not subject to interference by a precipitation of the catalyst.

The process as per the invention for preparing cyanogen by catalytic oxidation of hydrogen cyanide with oxygen comprises oxidation in a solution of at least 0.01 mole/l of copper nitrate in aliphatic ethers or in nitriles containing from 0 – 20 weight % of water. The oxygen may be replaced by other oxygen-containing gases such as air for the purpose of this oxidation; however, oxygen is preferred.

Since water is formed during the reaction and since it is desirable to operate in a homogeneous phase, preferred solvents are those which are miscible with water completely or partially. The following compounds may be used specifically:

Dialkyl ether of ethylene glycol, propylene glycol, butylene glycol, diethylene glycol, dipropylene glycol; or trialkyl ether of glycerol having up to 20 carbon atoms, preferably up to 10 carbon atoms, especially ethylene glycol dimethyl ether, ethylene glycol diethyl ether, ethylene glycol dipropyl ether, ethylene glycol dibutyl ether, 1,2-propylene glycol dimethyl ether, 1,2-propylene glycol methylethyl ether, 1,2-propylene glycol diethyl ether, 1,2-propylene glycol dipropyl ether, 1,2-propylene glycol methylbutyl ether, 1,3-propylene glycol dimethyl ether, 1,2-butylene glycol dimethyl ether, glycerol-trimethyl ether, glycerol-triethyl ether, glycerol-tripropyl ether, glycerol-dimethylethyl ether or ethers of polyglycols such as diethylene glycol dimethyl ether, diethylene glycol diethyl ether, dipropylene glycol dimethyl ether, triethylene glycol dimethyl ether or cyclic ethers such as tetrahydrofurane or also dioxane, nitriles such as acetonitriles, propionitrile and their homologs as well as benzonitrile. Particularly advantageous are ethers miscible with water, especially ethylene glycol dimethyl ether and diethylene glycol dimethyl ether, as well as acetonitrile.

Since water is produced during the reaction according to the reaction scheme

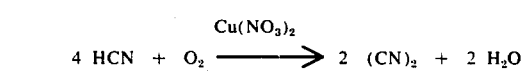

$$4\ HCN + O_2 \xrightarrow{Cu(NO_3)_2} 2\ (CN)_2 + 2\ H_2O$$

when operating continuously or when using diluting solvents and only a small amount of water, care has to be taken of constantly eliminating this water, e.g. by distillation, azeotropic distillation or adsorption by a dehydrating agent, for example from a side-current of the reaction solution. Ethylene glycol, dimethyl ether and acetonitrile form with the reaction water for example an azeotropically boiling mixture which enables the removal of water. For achieving an azeotropic distillation there may also be added, however, entrainers such as benzene or chlorinated hydrocarbons, e.g. 1-chlorobutane, 1-chloropropane, 2-chlorobutane, and tert.butyl chloride, for eliminating the water azeotropically. Preference is given to the use of entrainers which weigh less than water, the boiling point of which is approximately from 40° – 90°, which are immiscible with water and which do not seriously affect (in the reactor) the solubility of the copper catalyst.

The solvent should contain from 0 to 20 weight % of water during the reaction. When utilizing the above mentioned ethers, an advantageous rate of water content is from 0 – 5 weight %, especially from 0 – 3 weight %.

When using acetonitrile, the advantageous range is wider. Of course it is possible to prepare cyanogen also in a plain reaction if the acetonitrile employed contains less than 5 % of water. But it is disadvantageous that the required removal of the reaction water produces an azeotrope containing roughly 16 % of water which inhibits any phase separation. In order to be able to re-use this solvent, the water content must be reduced to less than 5 % by means of complicated and costly operations.

But, the difficult separation of the water from the azeotrope can be dispensed with to a great extent, if the solvent to be applied consists of acetonitrile, from 5 to 20 % of water and of at least 0.01 mole/l of $Cu(NO_3)_2$.

The advantageous utilization of larger quantities of water permits the execution of the reaction in an acetonitrile/water mixture, the composition of which approaches the composition of the azeotrope (at 760 mm of Hg 83.7 % of acetonitrile and 16.3 % of water). This possibility also avoids the need for adding azeotropic forming agents, such as benzene or chlorinated hydrocarbons.

Since the composition of the acetonitrile/water azeotrope depends on the pressure and since it varies between approximately 6 % of water (at 50 mm/Hg and 12° C) and 20 % of water (at 1 atmosphere above atmospheric pressure and 90° C), it is easily possible to remove the water from the azeotrope by means of distillation in vacuo. When doing so, a pressure of e.g. 135 mm of Hg produces an acetonitrile containing but 7.5 % of water which may be recycled immediately into the reaction. When operating at normal pressure, or approximately normal pressure, the utilization of acetonitrile offers the advantage that the boiling point of the azeotrope (760 mm of Hg, 76.5° C) is situated right within the optimum range of the reaction temperature (from 60° to 80° C). The acetonitrile is not affected under the reaction conditions.

As compared to the process according to German "Offenlegungsschrift" No. 2,355,040 (water as solvent), the process of the present invention requires for much lower concentration of nitrates, for example from 0.01 to 0.5 mole of copper nitrate. Without any additional expediture of material pure cyanogen is obtained.

The temperature of the solution during the reaction varies from 20° to 100° C, preferably from 40° to 80° C.

The reaction is carried out preferably at normal pressure, possibly under a slight overpressure up to 1 atmosphere above atmospheric pressure.

The catalyst, namely copper nitrate, e.g. $Cu(NO_3)_2 \cdot 3 H_2O$, is applied in concentrations of at least 0.01 mol/l, higher concentrations being not critical, and the employable maximum limit being given only by the solubility of the copper nitrate in the catalyst solution. Its concentration is preferably from 0.08 to 0.15 mol/l at a water content less than to 5 %, or from 0.08 to 0.5 mol/l at water contents of from 5 to 20 %. Whether the catalyst is added as such or formed in situ, does not make any difference; the important fact is that the reaction solution must contain copper ions and nitrate ions at the corresponding concentration rates in their diluted form. Generally further addition of other ions does not interfere.

The reaction speed depends on the pH. The pH of the solution should vary from −1.0 to +3.5, preferably from −1.0 to 2.5. Since the pH may shift to higher values due to secondary reactions during the main reaction, from an initial value of about 0 to 2.0, there might be a need for adding highly concentrated acids during the reaction, especially mineral acids, e.g. concentrated hydrochloric acid or $HClO_4$ (at 70 %), or organic acids such as formic acid, trifluoroacetic acid and benzene-sulfonic acid, in order to acidify the solution. Especially good results have been obtained with nitric acid. The pH values of the afore-mentioned reaction media have been determined by means of glass electrodes.

Since the efficient use of the oxygen depends especially on the degree of distribution and residence time, a complete conversion of the hydrocyanic acid generally requires a certain excess quantity of $O_2$, as compared to the quantity resulting from the stoichiometric calculation. This excess quantity may vary from twice the calculated quantity to ten times its amount.

Cyanogen is an organic intermediate product useful for many purposes, among them the preparation of the long-term fertilizer oxamid.

The following examples illustrate the invention:

EXAMPLE 1a (Comparative example according to U.S. Pat. No. 3,615,192)

1 g of copper acetate was dissolved in 250 ml of glacial acetic acid in a 500 ml four-necked flask equipped with a gas inlet frit, a glass electrode, thermometer and gas outlet. Air at 25° C was then conveyed first through a vessel with hydrogen cyanide cooled to 0° C and subsequently introduced into the reaction solution which was maintained at 27° −29° C. The pH value of the solution was −1. The gas current leaving the apparatus contained 0.8 % of $(CN)_2$ according to a gaschromatographic test. After 10 minutes the solution turned turbid, the color changed from bluegreen to violet, after a period of 15 minutes a flakey blue deposit had precipitated and settled, and the supernatant solution was limpid and free from catalyst. The escaping gas did not contain any discernible quantities of cyanogen. Even an air current conveyed over the catalyst for several hours did not succeed in reactivating the catalyst.

If oxidation takes place with oxygen under otherwise identical conditions, the catalyst loses irreversibly its efficiency after 30 minutes. As far as the initial cyanogen yield is concerned, it is approximately as low as when using air.

In other acids such as capronic acid and benzoic acid the cyanogen yield is considerably smaller, the catalyst life being less than 5 minutes. The reaction in ketones is the same as in acetic acid, however the pH rises in course of the reaction. Moreover, a sticky film is formed on the walls of the vessel and of the inlet pipe. When using amides, e.g. dimethylformamide, cyanogen is present in minor quantities only (from 10 to 20 % of the theory).

EXAMPLE 1b (according to the present invention)

The reaction was carried out under the same conditions as those of the first example except for the difference that as reaction mixture was used 1.2 g of Cu-nitrate in 250 ml of dimethoxy ethane. The reaction temperature was 30° C. The waste gas contained 1.5 % of cyanogen, which rose to 3 % upon acidification by means of 2 ml of $HNO_3$(conc.).

The acidification modified the pH from 0 to −1. After a reaction period of 2 hours the cyanogen was still formed at the same rate as at the beginning. No discoloration of the catalyst solution was observed.

EXAMPLE 2

A solution of 200 ml of dimethoxy ethane and 5 g of $Cu(NO_3)_2 \cdot 3 H_2O$ was heated to 50° C in an oblong multiple-necked ground glass flask equipped with a gas inlet frit, a glass electrode for measuring the pH, a thermometer, a dropping funnel and an intensive cooling device, and a current of 0.5 liter per minute of $O_2$ was introduced. 50 ml (34g) of hydrogen cyanide were then added dropwise per hour from the dropping funnel. Prior to the addition of hydrogen cyanide the pH was +0.5, after the addition of hydrogen cyanide the previously blue solution turned to a dark green shade, the pH rose again to a level above 1.0 and a brown sediment precipitated from the solution. By adding 4 ml of concentrated HCl the pH was maintained at the value of +0.5 during the reaction, the sediment was transformed to a solution and the solution showed a dark green shade. The cooling device kept at a temperature of −15° C, separated hydrogen cyanide from the gas current. The cyanogen which escaped via the cooling device was subsequently condensed by means of adjacent cooling traps. 30 g of cyanogen were extracted from these cooling traps by distillation at a bath temperature of 0° C, which corresponds to a yield of 91 % in relation to the hydrogen cyanide initially utilized.

EXAMPLE 3

5 g of $Cu(NO_3)_2 \cdot 3 H_2O$ were dissolved in the above described apparatus in 200 ml of dimethoxy ethane, 0.5 liter of $O_2$ p/minute conveyed through a frit and 50 ml (34g) of hydrogen cyanide added dropwise per hour at 50° C, the temperature being maintained at 45° – 50° C by cooling. The solution showed a lighter shade after 30 minutes and the pH rose up to +2.0. By addition of 1 ml of $HClO_4$ (at 70 %) a pH of +0.5 was achieved and, the solution showed a darker shade again. After having added all of the hydrogen cyanide, $O_2$ was further introduced for 15 minutes. 25 ml of cyanogen (24g) were removed from the receivers by distillation, corresponding to a yield of 71 % in relation to hydrogen cyanide.

EXAMPLE 4 (continuous process)

A reactor of 2 liters was equipped with a gas inlet frit, a glass electrode, thermometer, dropping funnel and gas outlet. This reactor was charged with a solution of 30 g of $Cu(NO_3)_2 \cdot 3 H_2O$ in 1500 ml of acetonitrile and 500 ml of 1-chlorobutane and heated to 70° – 72° C. A pH value of about +1.0 was determined. An oxygen current at the rate of 600 ml per minute was then introduced via the frit and 1 ml/minute of hydrogen cyanide added dropwise from the dropping funnel. Upon beginning of the reaction the color shade of the solution changed to a range from dark green to black. The solvent vapors which were carried along by non-reacted oxygen and produced cyanogen, were submitted to condensation and fed back into the reaction vessel via a water separator; the water which was thus removed from the cycle, was discharged from time to time. The refrigerator device was cooled to −15° C, cyanogen escaped via the refrigerator and condensed to yield dry-ice at −78° C in an adjacent cooling trap. After having added dropwise 200 ml of hydrogen cyanide, approximately 50 ml of water were discharged and 120 ml (114g) of cyanogen were obtained from the receiver, being 87 % of the theory.

About the same yields were obtained, if benzene (at a reactor temperature of 68° C) or 1-chloropropane (at a reactor temperature of 60° C) was employed as entrainer. The water which had been removed from the cycle contained 22 % by volume of acetonitrile, regardless whether benzene or 1-chlorobutane was used.

EXAMPLE 5

In the reactor as per the description of example 4 a solution of 20 g of $Cu(NO_3)_2 \cdot 3 H_2O$ in 0.5 l of benzonitrile and 0.5 l of 1-chloropropane was heated to 72° C, 700 ml of $O_2$ p/minute introduced via the frit and 60 ml of hydrogen cyanide added dropwise over a period of 1.5 hours (= 41 g = 1.5 mole). At a bath temperature of −5° C a quantity of 34 ml (32g) of cyanogen (i.e. 0.61 mole) were removed from the receiver by distillation. The yield was 82 % of the theory.

14 ml of water were removed from the cycle. During the reaction the pH of the solution rose from 0 to 3.0 and while the reaction was running, the pH was maintained at a level of from 2.0 to 2.5 by the addition of 3 ml of $HNO_3$ (conc.).

EXAMPLE 6

The reactor consists of a vertical heated tube having a diameter of 8 cm and a length of 3 m and which is equipped at bottom with a gas inlet valve and at the top with a 20 l balloon vessel (volume of the reactor = 25 l). The reactor was charged with a solution of 500 g of $Cu(NO_3)_2 \cdot 3 H_2O$ in 18 l of acetonitrile and 7 l of benzene, which had been heated to the boiling point. This boiling point was at 68° C. The described solution was simultaneously pumped through a centrifugal pump, which pumping operation induced the solution to rise in the heated tube. A second tube conveyed the solution downwards back to the gas inlet valve. On top of the balloon the vapors (composed of excess oxygen and cyanogen, which also contained solvent vapors and steam) were conveyed to a cooling device with water separator. The water was separated from the solvent in the condensor of the cooling device. Cyanogen was leaving from the cooling device and left condensed in the receivers. An overpressure of 0.1 atmosphere above atmospheric pressure was maintained in the apparatus by means of a reduction valve.

The hydrogen cyanide was introduced as a liquid at a location preceding the centrifugal pump, the oxygen was introduced via the gas inlet valve. The introduction rate per hour was 500 g of hydrogen cyanide (corresponding to 18.5 mole) and 125 l of oxygen ( 6 mole). In the cooling traps were condensed 420 g of cyanogen (corresponding to 87 % of the theory). 165 ml of water were separated simultaneously.

EXAMPLE 7

The reactor was composed of a vertical heatable tube of 8 cm inner diameter and of 3 m length, which was equipped at bottom with a gas inlet valve and at the top with a balloon vessel (diameter 36 cm). This balloon vessel was connected with the lower part of the reactor by means of a conveyor tube leading from the side of the balloon downwards. A centrifugal pump for cycling the reaction solution was inserted in this conveyor tube. The solution having risen in the heatable tube was then led downwards through the conveyor tube back to the gas inlet valve. The top of the balloon vessel was further equipped with a third orifice which led to a condensor. The total volume of the reactor including the side-conveyor tube and the lower part of the balloon vessel was 30 l.

The reactor was charged with a catalyst solution consisting of 20 l of acetonitrile, 2 l of water and 1.6 kg of $Cu(NO_3)_2 \cdot 3 H_2O$. The solution was heated to a temperature of from 70° to 75° C by the heating device of the reactor. Subsequently, oxygen was introduced through the gas inlet valve at the rate of 120 l per hour. 500 g per hour of anhydrous hydrocyanic acid were pumped in simultaneously through an inlet socket close to the gas inlet valve. The catalyst solution was maintained in the boiling stage by heating.

The vapors escaping from the balloon vessel reached the condensor which was kept at 15° C, while condensing acetonitrile and water. Neither the produced cyanogen nor the excess oxygen were condensed. The cyanogen was separated from the oxygen by freezing out. (The oxygen recovered during this operation may be recycled and fed back into the reactor if desired). The condensation product separated in the refrigerator device represented the azeotrope of water (about 16 %) and acetonitrile (about 84 %). This azeotrope may be separated according to known methods. It is well possible, for example, to eliminate roughly half of the water by fractional distillation in vacuo. The azeotrope which was boiling at a pressure of 175 mm and 34° C, contained merely 7.5 % of water. For re-use purposes there was no need to reduce the water content further, since the catalyst solution contained 10 % of water. The water content of the catalyst solution was maintained at about 10 % during the test run (by eliminating the azeotrope distillation and adding pure acetonitrile). The produced cyanogen was isolated in cooling traps at a rate of 430 g/h, a quantity corresponding to a yield of 89 %.

What is claimed is:

1. A process for the manufacture of cyanogen which comprises catalytically oxidizing hydrogen cyanide with oxygen in an aliphatic ether or a nitrile selected from the group consisting of acetonitrile, propionitrile, their homologs and benzonitrile containing from 0 to 20 weight % of water and at least 0.01 mole/l of $Cu(NO_3)_2$.

2. The process defined in claim 9, wherein 0 to 5 weight % of water is present.

3. The process defined in claim 10, wherein ethylene glycol dimethyl ether, diethylene glycol dimethyl ether or a combination thereof is present.

4. The process defined in claim 2, wherein 0.08 to 0.15 mole/l of $Cu(NO_3)_2$ is present.

5. The process defined in claim 1, wherein 5 to 20 weight % of water and 0.08 to 0.5 mole/l of $Cu(NO_3)_2$ are present.

6. The process defined in claim 1, wherein the nitrile is acetonitrile.

7. The process defined in claim 6, wherein acetonitrile and 5 to 20 weight % of water are present.

8. The process defined in claim 1, wherein the nitrile is benzonitrile.

9. The process defined in claim 1, wherein a pH of from −1.0 to +3.5 is maintained.

10. The process defined in claim 9, wherein a pH of −1.0 to +2.5 is maintained.

11. The process defined in claim 1, wherein the oxidation is continuous and water produced in the course of said oxidation is removed by means of azeotropic distillation.

12. The process defined in claim 11, wherein the azeotropic distillation is carried out in the presence of an entrainer.

* * * * *